US008796964B2

(12) United States Patent  (10) Patent No.: US 8,796,964 B2
Dietl et al.  (45) Date of Patent: Aug. 5, 2014

(54) CONTROLLABLE DIRECT CURRENT MOTOR HAVING A MODIFIED CHARACTERISTIC

(75) Inventors: Lothar Dietl, Aalen (DE); Alfred Schreiber, Kirchheim (DE); Richard E. Geitner, Aalen (DE)

(73) Assignee: C. & E. Fein GmbH (DE)

( * ) Notice: Subject to any disclaimer, the term of this patent is extended or adjusted under 35 U.S.C. 154(b) by 0 days.

(21) Appl. No.: 13/414,481

(22) Filed: Mar. 7, 2012

(65) Prior Publication Data

US 2012/0223663 A1  Sep. 6, 2012

Related U.S. Application Data

(63) Continuation of application No. PCT/EP2010/062553, filed on Aug. 27, 2010.

(30) Foreign Application Priority Data

Sep. 7, 2009 (DE) .......................... 10 2009 041 878

(51) Int. Cl.
 *H02P 6/16* (2006.01)
(52) U.S. Cl.
 USPC .................................... 318/400.07; 318/432
(58) Field of Classification Search
 USPC ........................................... 318/400.07, 432
 See application file for complete search history.

(56) References Cited

U.S. PATENT DOCUMENTS

| 5,097,184 | A | 3/1992 | Echtler et al. |
| 6,605,912 | B1* | 8/2003 | Bharadwaj et al. ...... 318/400.09 |
| 7,821,217 | B2* | 10/2010 | Abolhassani et al. ........ 318/432 |
| 2005/0231139 | A1 | 10/2005 | Lelkes et al. |
| 2007/0067678 | A1* | 3/2007 | Hosek et al. .................... 714/25 |
| 2007/0210733 | A1 | 9/2007 | Du et al. |
| 2007/0273235 | A1* | 11/2007 | Kaizuka et al. .......... 310/156.53 |
| 2007/0296296 | A1* | 12/2007 | Masuda et al. ................ 310/119 |
| 2008/0297080 | A1 | 12/2008 | Bosch |

FOREIGN PATENT DOCUMENTS

| DE | 4009402 A1 | 9/1991 |
| DE | 102004019004 A1 | 11/2005 |
| DE | 102004027635 A1 | 6/2006 |
| EP | 0865147 A1 | 9/1998 |
| GB | 1051588 A | 12/1966 |
| WO | 2008150334 A1 | 12/2008 |

OTHER PUBLICATIONS

International Search Report; Application No. PCT/EP2010/062553; Issued: Feb. 1, 2011; Mailing Date: Feb. 11, 2011; 4 pages.

* cited by examiner

*Primary Examiner* — Erick Glass
(74) *Attorney, Agent, or Firm* — St. Onge Steward Johnston & Reens LLC (57) ABSTRACT

A direct-current motor is disclosed, preferably in the form of an EC motor, which has a matching arrangement in order to vary its rotation-speed/torque characteristic, having a permanently effective control circuit for controlling the motor, which control circuit is programmed such that the rotation-speed/torque characteristic is permanently varied with respect to rated operation or operation with the matching arrangement.

20 Claims, 5 Drawing Sheets

CONTROLLABLE DIRECT CURRENT MOTOR HAVING A MODIFIED CHARACTERISTIC

CROSSREFERENCES TO RELATED APPLICATIONS

This application is a continuation of international patent application PCT/EP2010/062553, filed on Aug. 27, 2010 designating the U.S., which international patent application has been published in German language and claims priority from German patent application 10 2009 041 878.4, filed on Sep. 7, 2009. The entire contents of these priority applications are incorporated herein by reference.

BACKGROUND OF THE INVENTION

The invention relates to a controllable direct-current motor, in particular an EC motor, which has a modified rotation-speed/torque characteristic in comparison to a conventional motor, for example as in the case of a motor which is coupled to a mechanical two-gear variable-speed gearbox.

In the case of electric tools in the prior art, motors are in general coupled to variable-speed gearboxes, in order to cover a wider rotation-speed/torque range. Two-gear machines, three-gear machines and in some cases even four-gear machines are provided for this purpose.

However, the use of a variable-speed gearbox involves considerable complexity, associated with an additional weight and space requirement. Furthermore, mechanical gearboxes must not be switched when under load during operation. There is therefore no capability to match the optimum gearbox step-up ratio to the current working load during operation.

DE 10 2004 027 635 A1 discloses an electric tool having a drive unit with a motor which comprises a rotor with a permanent magnet and a stator, with a motor controller being provided which is designed such that it controls the motor in a first rotation-speed range on the basis of a voltage-controlled operating mode, and controls it in a second rotation-speed range, which is adjacent to a first rotation-speed range in the direction of a higher rotation speed, on the basis of a field-weakening mode. In the first rotation-speed range, the motor is operated on a voltage-controlled basis, with the motor controller in this operating mode applying a voltage to the motor in order to predetermine the rotation speed of the motor. When a specific rotation speed is reached, the motor switches to a different operating mode, which is referred to as the field-weakening mode. In this case, the induced back-emf is weakened, thus resulting in a higher rotation speed with a lower torque. Overall, therefore, the motor can be designed for a lower mean rotation speed, while switching takes place to the field-weakening mode in order to achieve higher rotation speeds. This allows an extended rotation-speed/torque range to be achieved without using a variable-speed mechanical gearbox.

However, this represents a special case only for very specific applications, in which a user must switch to the field-weakening mode in order to increase the rotation speed.

SUMMARY OF THE INVENTION

In view of this it is a first object of the invention invention to disclose a direct-current motor which has an extended rotation-speed/torque range, when compared with prior designs.

It is a second object of the invention to disclose a direct-current motor which allows a flexible matching to different requirements of load or operation.

It is a third object of the invention to disclose a direct-current motor which allows to at least partially replace a mechanical gear box conventionally used in combination with a conventional direct-current motor.

According to one aspect of the invention, these and other objects are achieved by a direct-current motor having a specific rotation-speed/torque characteristic during rated operation, said motor comprising a matching arrangement for varying at least one parameter selected from the group consisting of rotation speed and torque, and having a permanently effective control circuit for controlling said motor, said control circuit being programmed such that a rotation-speed/torque characteristic of said motor is permanently varied with respect to said specific rotation-speed/torque characteristic during rated operation.

The object of the invention is achieved completely in this way.

This is because, according to the invention, the motor is designed or is changed by switchable measures to a state such that the rotation-speed/torque characteristic is varied in the thermally stable state with respect to its normal operation. In this case, the permanently effective control circuit applies a change to the rotation-speed/torque characteristic to the motor. This represents a deliberate reduction at least of the rotation speed or of the torque, in order to apply the desired new power characteristic to the motor.

In general, this means that the motor would be operated at an increased power only by the matching arrangement, which would lead to thermal overloading during continuous operation. In this case, the control circuit provides limiting to a changed power characteristic, thus precluding thermal overloading during continuous operation in every sub-area of the rotation-speed/torque characteristic.

As will be explained in more detail in the following text, it is also possible for the matching arrangement only to produce a higher no-load rotation speed and a correspondingly reduced stationary torque by reducing the back-emf in the so-called field-weakening mode, such that, in principle, this results in no operation in the potentially thermal overload range.

In any case, the permanently effective control circuit can apply a different rotation-speed/torque characteristic in order to result in a changed rotation-speed/torque characteristic in the end. For example, this makes it possible to simulate the behaviour of a motor with a mechanically variable-speed gearbox.

The permanently effective control circuit allows the motor to be optimally matched for different operating states. Depending on the configuration of the motor and depending on the configuration of the permanently effective control circuit, this makes it possible to produce rotation-speed/torque characteristics which are matched to specific nominal characteristics during operation. By way of example, a suitable design makes it possible to achieve a steeper rotation-speed/torque profile than in the case of a conventional direct-current motor which is otherwise of the same type.

Alternatively or additionally, a rotation-speed/torque characteristic can be achieved which is designed for greater use in a high rotation-speed range and which, furthermore, is also suitable for operation with a higher torque in a lower rotation-speed range.

In this case, depending on the design of the motor and of the permanently effective control circuit, the rotation-speed/torque characteristic can be matched to numerous nominal profiles, in which case it is also possible to implement the typical behaviour of a motor which is provided with a two-gear or multi-gear gearbox.

In principle, the extended rotation-speed/torque characteristic of the motor according to the invention is achieved with an increased power, which can be reduced in a suitable manner by the permanently effective control circuit in order to provide improved matching to a desired power characteristic over the entire rotation-speed/torque profile.

In this case, the motor is preferably in the form of an EC motor. An EC motor typically means a brushless direct-current machine in which the rotor has a permanent magnet and the stator consists of a plurality of electromagnets. The position of the rotor is measured continuously, for example via the back induction voltage, via the resultant current or by means of a position transmitter, for example a Hall effect sensor. The position of the rotor can also be determined using mathematical algorithms, without the use of sensors. The electromagnets in the stator are commutated by means of a suitable circuit, for example via a bridge circuit composed of MOS-FET transistors.

EC motors are particularly suitable for the solution according to the invention, since, because of the electronic commutation, they have an electronic controller in any case, and since, in particular, brush sparking is avoided in this case.

The permanently effective control circuit is in principle used to influence the phase voltage of the motor, in order to limit it in a suitable manner. Various circuits are in principle feasible for this purpose, such as pulse-amplitude modulation, pulse-frequency modulation or pulse-phase modulation. However, pulse-width modulation (PWM), is particularly preferably used for this purpose.

According to the invention, a suitable control circuit such as this is now used, for example, in the form of a PWM controller in order in principle to achieve an extended operating range for the motor with an unchanged motor, for example as in the case of a motor which is coupled to a mechanical two-gear gearbox, with thermal overloading during continuous operation being avoided. In principle, the motor is for this purpose operated at a higher power than is possible during continuous operation, since this would result in thermal overloading. The increased power can either be available all the time by, for example, operating the motor at a voltage higher than the rated voltage, while the power is in turn limited to permissible values by the permanently effective control circuit.

However, a matching arrangement is preferably provided which is electronically switchable. In this way, the motor is, for example, operated at a higher voltage than is thermally permissible during continuous operation. In combination with the permanently effective control circuit, the motor power is then once again limited to a value which is thermally permissible during continuous operation. In this case, the control circuit can set a desired rotation-speed/torque characteristic.

In principle, it is irrelevant how the matching arrangement is designed. There are various options for this purpose.

For example, the matching arrangement may comprise star-delta switching. In this case, the coils (coil groups) associated with one phase are connected either in star or in delta. Switching from star to delta increases the line voltage by a factor $\sqrt{3}$. Accordingly, the rotation speed likewise increases by a factor $\sqrt{3}$; the maximum power is tripled. In this case, semiconductor switches are preferably used for switching. A switch such as this may also consist of a plurality of individual semiconductors, for example of two MOSFETs.

According to a further embodiment of the invention, the matching arrangement comprises coil-group switching in the form of series/parallel switching.

In this case, the winding of one coil of one phase of the electric motor is subdivided into two equal partial coils. The partial coils can be connected either in series or in parallel by means of three semiconductor switches. If connected in series, the total resistance is 2 R, and the number of turns is 2 z, while these figures are R/2 and z when connected in parallel, where R is the resistance of a partial coil and z is the number of turns of a partial coil. The stationary torque, which is proportional to the line current, will be doubled when switching from series to parallel, assuming that the applied voltage U remains the same and that there is no electronic or other current limiting. If the motor is thermally designed for series connection, then the coil-group switching can be used for electronic switching to a characteristic with twice the no-load rotation speed.

According to a further feature of the invention, the matching arrangement comprises cell-group switching in the form of series/parallel switching for the rechargeable-battery cells of a voltage supply for the motor.

If the motor is supplied from rechargeable-battery cells, these can be subdivided into two cell groups of the same type. If the cell groups are connected in parallel, then this results in an unchanged voltage with twice the current level. However, if the cell groups are connected in series, then this results in the voltage being doubled. This can once again be achieved by semiconductor switches. If an electric motor which is connected to the rechargeable-battery pack is thermally designed for the cell groups to be connected in parallel, then the switching to series connection can be used for electronic switching to a characteristic with a maximum of twice the no-load rotation speed.

The matching arrangement is preferably electronically controllable.

This allows electronic control for variation of the matching arrangement to be combined with a permanently effective control circuit for controlling the motor, thus resulting in rapid electronic switching between preferred operating ranges.

In principle, a smaller number of turns allows the motor to also be designed for a state which is thermally unstable for continuous operation and to nevertheless be operated in a thermally permissible range by means of the control circuit. This is because a smaller number of turns (with the filling factor remaining the same) results in a higher no-load rotation speed and a greater stationary torque.

Changing the winding results in the rotation-speed/torque characteristic being shifted parallel outwards. The no-load rotation speed and the stationary torque are increased, and the maximum power is likewise increased. However, wide ranges of this characteristic are thermally no longer stable.

The combination with the permanently effective control circuit now allows this new characteristic to be corrected such that a high output voltage is chosen for rotation speeds in the vicinity of the no-load rotation speed, as a result of which the higher no-load rotation speed is actually achieved. At relatively low rotation speeds, a reduction takes place to a thermally permissible range. This allows the behaviour of the motor to be approximated to that of a motor which is coupled to a two-gear gearbox or to a multi-gear gearbox.

As already mentioned above, the matching arrangement can also be designed to weaken the induced back-emf.

While the motor is operated as a conventional motor without the matching arrangement, weakening of the induced back-emf results in an increased rotation speed. A changed rotation-speed/torque characteristic is now applied to the motor by means of the permanently effective control circuit.

This also allows the motor to be operated with a changed rotation-speed/torque characteristic, for example with an extended rotation-speed/torque characteristic. In addition, provision can be made for influencing by a user or by suitable parameters.

The matching arrangement may also allow continuously-variable adjustment of the phase angle between the rotor field produced by the rotor and the exciter field produced by the stator, thus allowing the rotation speed to be adjusted.

In one preferred development of the invention, the control circuit is designed to limit the motor power as a function of at least one operating parameter over the entire operating range during continuous operation.

The operating parameter may preferably be an operating parameter which is chosen from the group which is formed by the rotation speed, the torque, the current draw, the temperatures and combinations thereof.

Preferably, the control circuit is designed to control the power of the motor by comparison of at least one operating parameter with permissible values of the operating parameter.

Furthermore, the control circuit can be designed to control the phase voltage of the motor by measurement of the actual value of at least one operating parameter, and subsequent determination and implementation of the associated value of the voltage reduction.

This ensures that the motor power is limited to a range which is thermally permissible for continuous operation, allowing deliberate matching of the rotation-speed/torque characteristic of the motor to a desired nominal characteristic.

Permissible values of the respective operating parameter may be stored in a memory in the form of a matrix, a family of characteristics or a mathematical function.

The motor power can thus be automatically reduced to a value which is thermally permissible for the respective range during continuous operation by comparison of the actual operating parameters with the permissible values for the respective operating parameter.

Alternatively, the permanently defined values relating to the respective operating parameters may be stored in a memory in the form of a matrix, a family of characteristics or a mathematical function.

This allows a value for the voltage reduction to be allocated immediately by measurement of the actual values of an operating parameter. The magnitude of this value is determined, for example, in initial trials, so as to ensure thermally permissible continuous operation.

Furthermore, the control circuit can be designed to influence the matching arrangement as a function of the permissible values for at least one operating parameter.

In addition, the motor power can be influenced as a function of the load or the motor power can be influenced as a function of the user, for example by inputting via a push button.

In this case, the control circuit is preferably designed to provide a continuous transition for the influencing of the matching arrangement, preferably operating with a function of the respective operating parameter.

According to a further embodiment of the invention, the control circuit is programmed such that electronic switching takes place for activation of the matching arrangement on a sensor-controlled basis or by a user, depending on a switch position.

This makes it possible to achieve automatic switching, or switching which can be influenced manually.

In this case, according to a further embodiment of the invention, the control circuit can also be programmed for automatic switching, in order to keep one operating parameter constant (within certain limits).

Furthermore, the motor according to the invention can also be coupled to a single-step or multi-step mechanical gearbox, which can be designed to be switchable.

In this case, switching can take place between different mechanical and electronic switching steps, preferably by means of a common switch.

This allows electric tools to be produced with considerably extended operating characteristics without any need for considerably more powerful electric motors.

The motor according to the invention can advantageously be used in particular for screwdrivers and drilling machines, but also offers advantages for other applications (for example angle grinders, which require different rotation speeds for rough grinding and cutting).

Furthermore, the object of the invention is achieved by a direct-current motor, in particular an EC motor, which is designed such that it operates in a thermally impermissible range during continuous operation, at least in sub-areas of its rotation-speed/torque characteristic, having a permanently effective control circuit for controlling the motor, which control circuit is programmed such that the motor is operated in a thermally permissible range during continuous operation, and having a sensor for detection of a time-dependent rise in a load on the motor, which sensor is coupled to the control circuit in order to initiate an increase in the output power of the motor, over a limited time, if a predetermined threshold value is exceeded.

The object of the invention is also achieved in this way.

According to the invention, the motor is operated for a limited time at an increased output power, if the sensor detects that a threshold value which is characteristic for loading of the motor has been exceeded. By way of example, this may be the rate of change of the current draw $dI/dT$, or a rapid rotation-speed drop $-dn/dT$.

As a result of a "boost function" such as this, the motor is operated briefly at an increased output power, in order to overcome an obstruction, for example. For example, this may be striking a knot hole or an iron reinforcement, or else countersinking of a screwhead into (solid) material with a drilling process or a screwdriving process.

Preferably, the control circuit is designed to reduce the output power of the motor to the rating or to a value below this, once a specific time interval has passed after initiation of the limited increase in the motor power, or when the product of the square of the current and the time has reached a specific threshold value.

This measure ensures that the motor is operated only briefly at an increased power and is once again operated at the rating or reduced power at the right time in order to reliably avoid thermal overloading.

It is self-evident that the features mentioned above can be used not only in the respectively stated combination but also in other combinations or on their own without departing from the scope of the present invention.

BRIEF DESCRIPTION OF THE DRAWINGS

Further features and advantages of the invention will become evident from the following description of preferred exemplary embodiments, with reference to the drawing, in which:

FIGS. 6a, b show an illustration of coil-group switching between series operation and parallel operation;

FIGS. 7a, b show an illustration of cell-group switching of two rechargeable-battery assemblies;

DETAILED DESCRIPTION OF PREFERRED EMBODIMENTS

Figure 1:
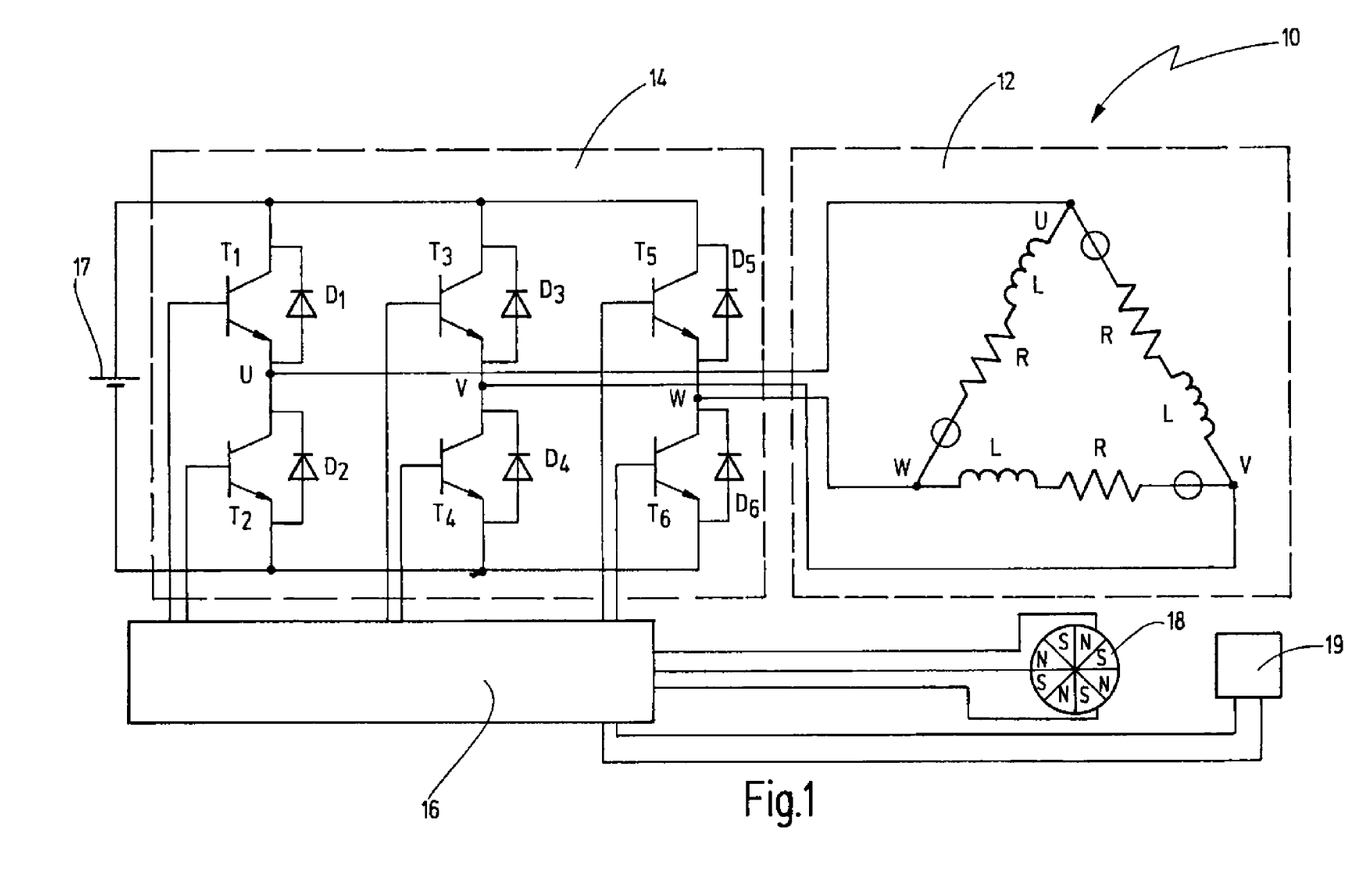
FIG. 1 shows an equivalent circuit of a motor according to the invention.

The electric motor according to the invention is a direct-current motor, which is preferably in the form of an EC motor, that is to say a brushless machine with a permanent-magnet rotor and electronic commutation. A circuit diagram of an electric motor such as this is illustrated in FIG. 1, and is annotated 10 overall.

The electric motor 10 according to the invention comprises the motor 12 in the relatively narrow sense with a permanent magnet rotor (not illustrated) and a stator with three stator windings L, whose resistance is R. The stator windings L are connected in delta and are connected at the points U, V, W to power electronics 14, which are used to drive the motor 12. The power electronics 14 comprise three transistor bridges of field-effect transistors $T_1$, $T_2$, with associated respective diodes $D_1$, $D_2$, as well as $T_3$, $T_4$ with $D_3$, $D_4$, and $T_5$, $T_6$ with $D_5$, $D_6$. The phases U, V, W are connected to the respective connecting points U, V and W. A rechargeable battery, which is annotated 17, is provided for the voltage supply.

A microcontroller 16 is used to drive the power electronics 14 and outputs a pulse-width-modulated control voltage (PWM) to the power electronics 14. The position of the rotor is monitored via a position transmitter 18, which is coupled to the microcontroller 16. Alternatively, the position of the rotor can also be determined without a position transmitter, for example by measurement of the back-emf.

The pulse-width-modulated control voltage (PWM voltage) operates the motor with a fixed predetermined rotation-speed/torque characteristic, which is not the same as the characteristic of a conventional EC motor. This will be explained in more detail in the following text with reference to FIGS. 2 to 4.

Figure 2:
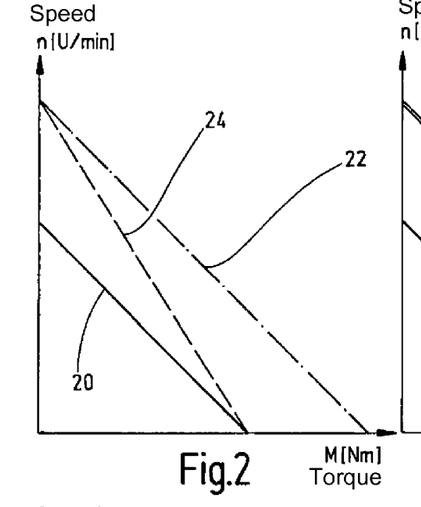
FIGS. 2-4 show various rotation-speed/torque characteristics for motors according to the invention of different design.

In FIG. 2, the characteristic of a conventional EC motor is annotated 20.

The invention now provides various measures (matching arrangement), by means of which a motor such as this can be operated with a changed rotation-speed/torque characteristic, for example as can normally be achieved only in combination with a mechanically variable-speed gearbox.

In principle, the motor is for this purpose operated at an increased phase voltage, which is either permanently increased or is increased electronically switchably by a suitable measure, as will be explained in detail in the following text. An increase in the phase voltage leads to a parallel shift of the rotation-speed/torque characteristic 20, as illustrated by the characteristic 22 in FIG. 2.

If a motor such as this, which is designed for the characteristic 20 during normal operation, is operated at an increased phase voltage, thus resulting in the characteristic 22, then this leads to thermal overloading after a short time.

According to the invention, the motor is now driven via the control circuit such that the increased power is permanently limited by the permanently effective PWM. For example, this can result in the new rotation-speed/torque characteristic 24.

In order that this motor still operates in a thermally permissible range during continuous operation, the windings or the appropriate ventilation measures must be appropriately adapted. In any case, any desired characteristic below the characteristic 22 can be selected with the aid of the permanently effective PWM. The characteristic 24 is illustrated by way of example here.

Pulse-width modulation of an input-side DC voltage $U_0$ allows the output voltage of a PWM circuit (if the load is not purely resistive) to be reduced very quickly to a value between $U_0$ and 0. A factor s can be defined, while $1 \leq s \leq 0$, by means of which the output voltage U of a PWM circuit can be represented as:

$$U = s \cdot U_0$$

The factor s is therefore the ratio of the output voltage to the input voltage and, for standard requirements, is between 1 and about 0.01, depending on the resolution of the circuit. s may be constant over time, may have a periodic time dependency or may have a profile which is dependent on measured or stored parameter values (for example current, rotation speed, switch position).

In particular, s can be incorporated in an existing rotation-speed/torque characteristic of a motor, for example by setting s=1 in the no-load rotation-speed range from $n_0$ to $0.8 \cdot n_0$. For example, s=0.3 could be fixed for s in the medium rotation-speed range from $0.8 \cdot n_0$ to $0.4 \cdot n_0$, and, for example, could be set to s=0.1 in the low rotation-speed range, in the range from $0.4 \cdot n_0$ to 0.

A rotation-speed/torque characteristic which has been shifted to a thermally impermissible range by the increase in the phase voltage can thus be adapted in a desired manner, which rotation-speed/torque characteristic corresponds to a different characteristic which, for example, simulates a variable-speed mechanical gearbox.

Figure 4:
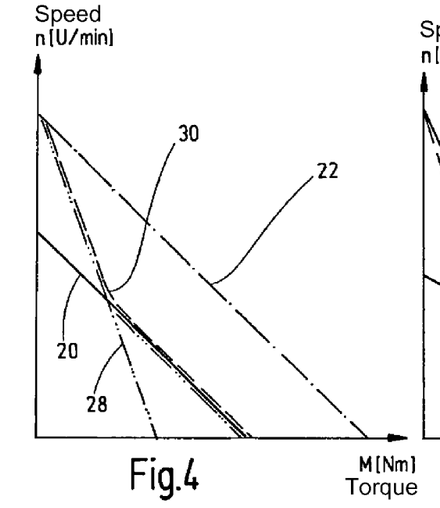

By way of example, FIG. 4 illustrates one such situation. While the characteristic 20 represents the normal characteristic of an EC motor, the characteristic 22 once again shows the characteristic which has been shifted parallel by an increase in the phase voltage. The characteristic 28 in contrast shows a rotation-speed/torque characteristic which is achieved with a mechanical step-up ratio. A variable-speed mechanical two-gear gearbox in combination with the EC motor will therefore lead, for example, to a characteristic whose upper section would run along the curve 28 and then bends away from the intersection point with the curve 20, and continues to run along the curve 20. A characteristic such as this can be simulated with the motor according to the invention, for example as indicated by the characteristic 30 in FIG. 4. In order to avoid a sudden change, the factor s is in this case not changed suddenly, since this can lead to control oscillations when load changes occur. By way of example, s is therefore chosen as a linear function of the rotation speed in the transitional range. Instead of the rotation speed as the independent parameter, it is also possible to choose the torque, the current level, the temperature or a combination thereof.

Figure 3:
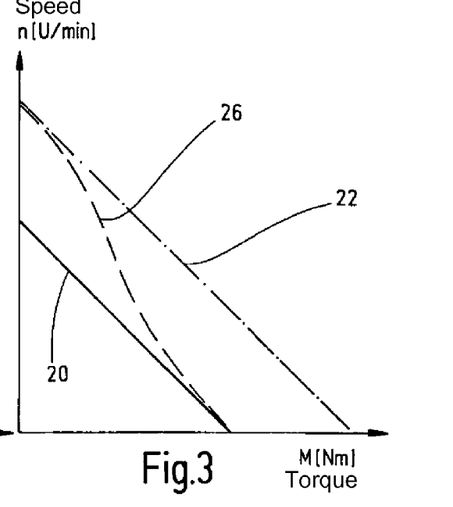

FIG. 3 shows a further rotation-speed/torque characteristic, which is annotated 26. In this case, the motor allows greater use in the region of high rotation speeds, associated with use in the region of lower rotation speeds with a high torque.

A range of measures which allow an electronically switchable increase in the phase voltage will now be explained in more detail with reference to FIGS. 5 to 7.

Figure 5:
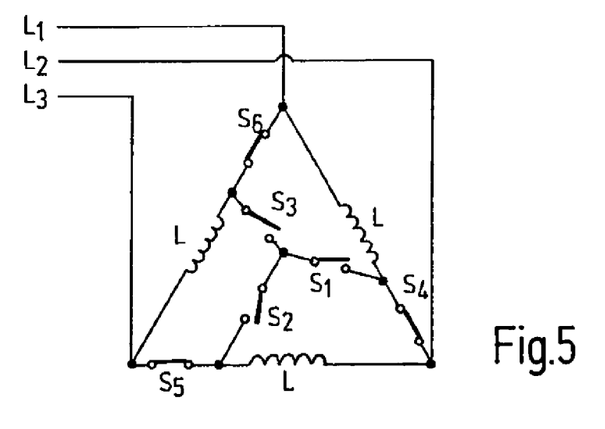
FIG. 5 shows a schematic illustration of star-delta switching.

FIG. 5 shows star-delta switching. The three coil groups L of the stator are arranged connected in delta, with respective switches S4, S5, S6 being located in their outer branches. In addition, the coils L can be connected from the outer branch via a star circuit, via the switches S1, S2, S3. If the switches S1, S2, S3 are open and the switches S4, S5, S6 have been closed, then this results in a delta circuit. In contrast, if the switches S1, S2, S3 are closed and the switches S4, S5, S6 are open, then this results in a star circuit. Switching from star to delta increases the line voltage by the factor √3. Correspondingly, the rotation speed is likewise increased by the factor √3, while the maximum power is tripled.

Semiconductor switches are preferably used for switching. One such switch (S1 to S6) may also consist of a plurality of individual semiconductors, for example of two MOSFETs.

Figure 6:
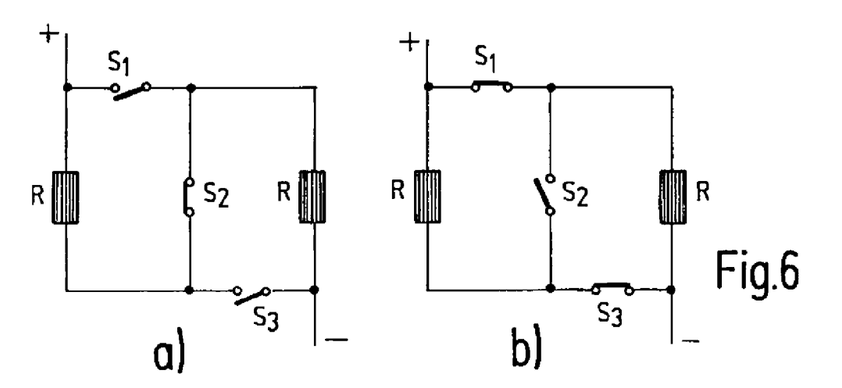

FIG. 6 shows the option of coil switching for switching the coil groups between parallel operation (FIG. 6b) and series operation (FIG. 6a).

In this case, the winding of one coil of one phase of the electric motor is identified by the number of turns 2 z, the wire diameter d and two connections (2 z, d). These have the resistance 2 R. The coil is subdivided into two partial coils with (z, d), which each have the resistance R.

If the series-connected partial coils are supplied with a voltage U, then this results in a phase current of:

$$I_{phase,series} = 2\,z \cdot U/2\,R = z \cdot U/R$$

If connected in parallel, the voltage U is applied to each partial coil. The phase current in the two branches is calculated to be:

$$I_{phase,parallel} = 2 \cdot I_{branch} = 2\,z \cdot U/R = 2\,I_{phase,series}$$

The partial coils can be connected in series (S1 and S3 open, S2 closed, see FIG. 6a)) or in parallel (S1 and S3 closed, S2 open, cf. FIG. 6b)), using three semiconductor switches S1, S2, S3. If connected in series, the total resistance is 2 R; this is R/2 when connected in parallel. The stationary torque, which is proportional to the current, will likewise be doubled when switching from series to parallel, because the phase current is twice as great, assuming that the applied voltage remains the same and there is no electronic or other current limiting. Because there are half the number of turns when connected in parallel, the rotation speed will likewise be doubled when switching takes place in the same direction.

If the motor is thermally designed for series connection, the series/parallel switching in conjunction with a permanently effective PWM can be used for electronic switching to a characteristic with twice the no-load rotation speed and twice the stationary torque.

Figure 7:
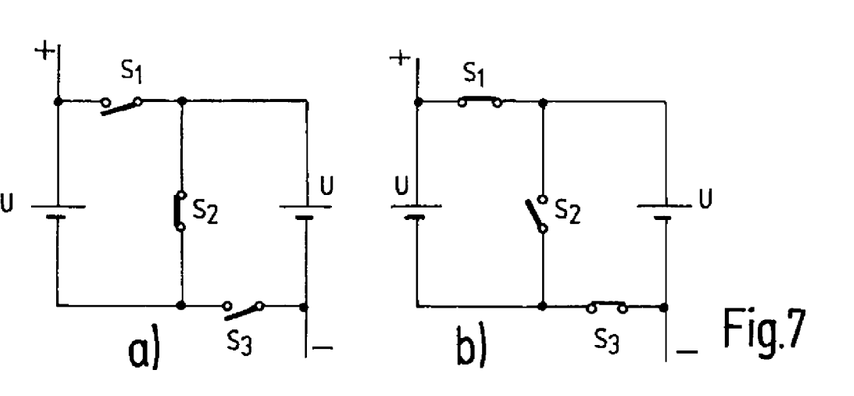

FIG. 7 shows the possibility of cell-group switching for a rechargeable battery which consists of two partial groups.

A rechargeable battery is assumed to have 2m individual rechargeable-battery cells (m=1, 2, . . . ) each having a voltage of U1 in the fully-charged state. The rechargeable-battery cells are first of all connected in series (hard-wired) in two half-packs with m cells. The total voltage of the half-pack is U=m·U1. The two half-packs are connected in series or in parallel with one another by means of three semiconductor circuits. The series circuit is shown in FIG. 7a). The switch S2 is closed, while the switches S1, S3 are open.

In contrast, when connected in parallel, this results in the position shown in FIG. 7b), with the switch S2 being open and the switches S1, S2 being closed. It is therefore possible to switch between the phase voltage U and 2 U. If a motor which is connected to the rechargeable-battery pack is thermally designed for the half-packs to be connected in parallel, then switching to series connection in conjunction with the permanently effective PWM can be used for electronic switching to a characteristic with a maximum of double the no-load rotation speed.

Furthermore, it is possible in principle to change the windings of the motor for a different rotation speed, which will result in this being operated continuously in the thermally unstable range. Once again, the permanently effective PWM is used to operate the motor in the thermally stable range.

An electric motor with a winding (z, d) is assumed to be thermally designed for a rated voltage $U_0$. The no-load rotation speed is assumed to be $n_0$. The motor windings are changed to a different winding, which leads to a higher no-load rotation speed $x \cdot n_0$ (x>1) with the same characteristic gradient, at the same voltage $U_0$. This is achieved by a change in the number of turns from z to z/x and a change in the wire diameter from d to $d \cdot \sqrt{x}$. If z/x is not an integer, the next closest integer can be chosen. The standard diameter closest to $d \cdot \sqrt{x}$ can be chosen as the wire diameter.

The result of the winding change is a rotation-speed/torque characteristic which is shifted parallel by the factor x. The no-load rotation speed and the stationary torque have each become greater by the factor x. The maximum power is greater by the factor $x^2$, as a result of which wide ranges of the characteristic are no longer thermally stable.

The new characteristic can be corrected by combination with a permanently effective PWM, such that s=1 is chosen for rotation speeds in the vicinity of the no-load rotation speed, thus actually resulting in a higher no-load rotation speed. At relatively low rotation speeds, s is continuously varied to s=1/x, in order to arrive at the thermally stable range of the original characteristic.

A further measure for modification of the characteristic of the EC motor is to weaken the induced back-emf, which is also referred to as field weakening.

The field weakening can be achieved using the same circuit as that shown in FIG. 1. All that is necessary for this purpose is to differently programme the microcontroller 16.

Figure 8:
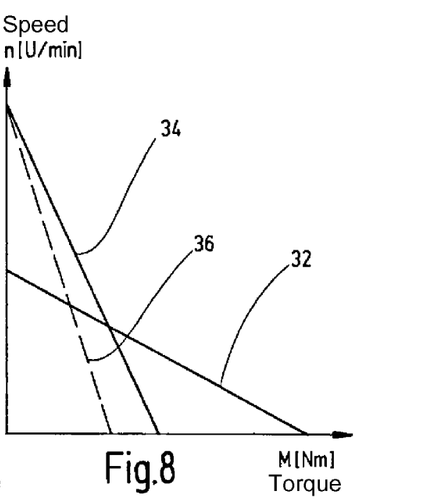
FIGS. 8-13 show various rotation-speed/torque characteristics of motors according to the invention of different design.

FIG. 8 shows a rotation-speed/torque characteristic of an EC motor driven linearly by an (electronically generated) voltage with a constant amplitude, the same signal waveform and a constant phase with respect to the back-emf. This characteristic, which is annotated 32, is characterized by the no-load rotation speed and the stationary torque. The gradient of the characteristic can be changed by weakening the magnetic field or the back-emf, by changing the phase between the drive signal and the back-emf. In this case, the no-load rotation speed increases, and the stationary torque decreases by the same factor, cf. the new characteristic 34 in FIG. 8.

The motor can be quickly switched to a new characteristic in particular by weakening the back-emf.

However, it is not always possible to achieve the desired characteristic in this way since a change in the no-load rotation speed and in the stationary torque occurs when switching between normal operation (characteristic 32) and field-weakening operation (characteristic 34) with the same factor.

According to the invention, such field weakening is now additionally combined with the permanently effective PWM. This makes it possible to achieve any desired characteristics below the two characteristics 32, 34. This is illustrated by way of example in FIG. 8 by a characteristic 36, which has a steeper rotation-speed/torque characteristic.

Figure 9:
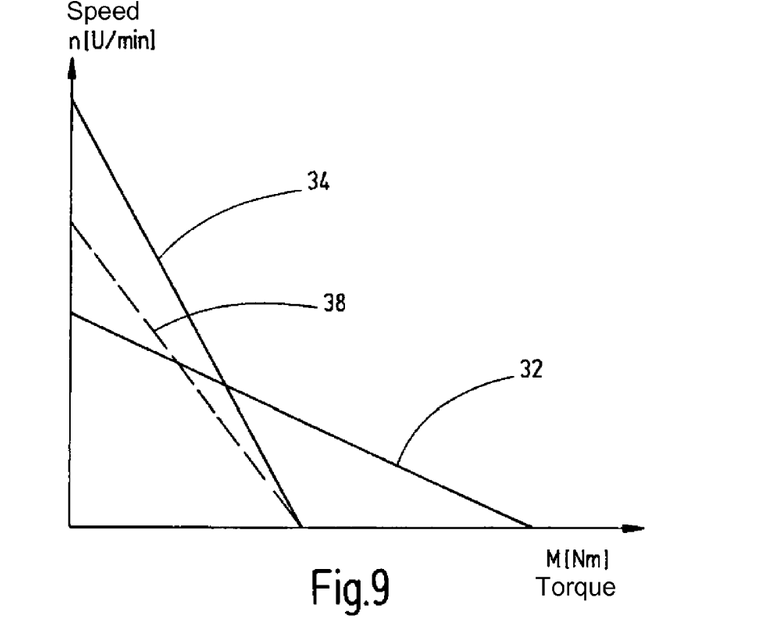

In contrast, FIG. 9 shows a new rotation-speed/torque characteristic 38, which has a lower no-load rotation speed with the same stationary torque.

Figure 10:
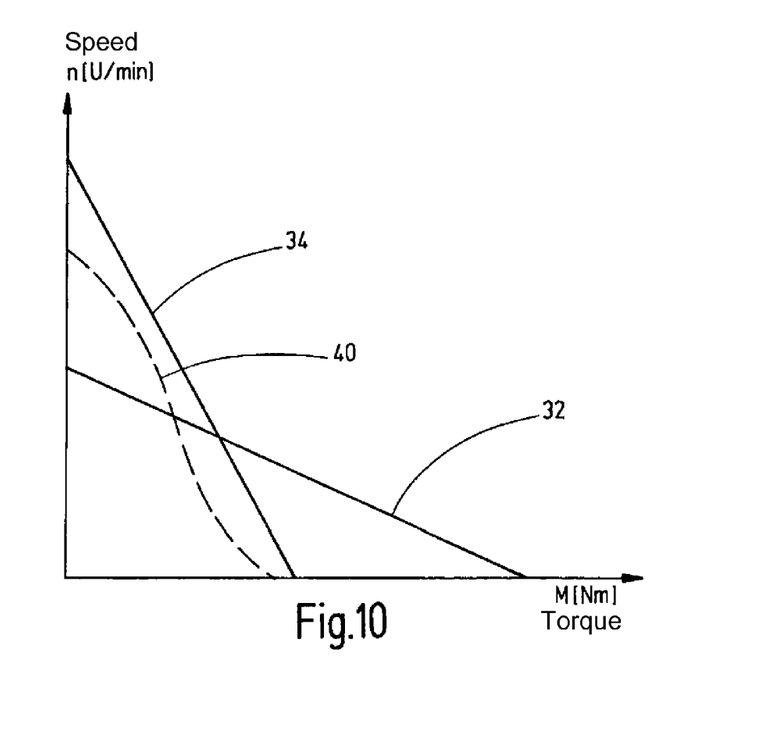

FIG. 10 shows a further feasible new characteristic 40, which is designed for use at relatively high rotation speeds with a low torque, on the one hand, and with a relatively high torque at low rotation speeds, on the other hand. If the field weakening is made switchable, then any desired characteristics can also be achieved, which run into the lower region of the curve 32 up to the stationary torque.

Figures 11, 12:
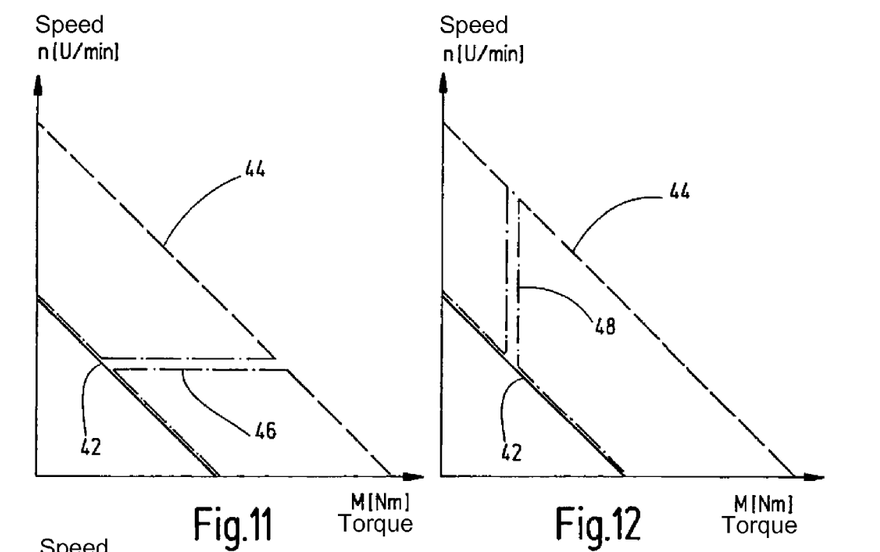

FIG. 11 shows a "boost function", in which the electric motor 10 is briefly operated with an increased torque in order, for example, to overcome an obstruction which is detected by a sensor 19 (FIG. 1). If, for example, the sensor 19 detects a brief rise in the torque which exceeds a specific threshold value, then the torque is briefly increased from the normal characteristic 42 up to the parallel-shifted characteristic 44 with an increased line voltage, as is indicated by the characteristic 46. In order to avoid thermal overloading, the torque is automatically reduced to the normal characteristic 42 again once a predetermined time interval has elapsed (for example 5 seconds).

FIG. 12 shows a corresponding boost function for the rotation speed. If the sensor 19 detects, for example, a brief reduction in the rotation speed, which exceeds a specific threshold value per unit time, then the motor is briefly operated at an increased rotation speed, as is indicated by the characteristic 48. In this case as well, the rotation speed is once again reduced to the rotation speed corresponding to the normal characteristic 42 after a short time (for example 3 to 5 seconds).

Figure 13:
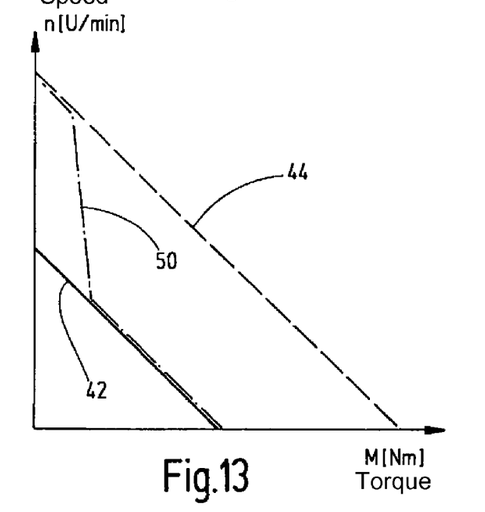

By way of example, FIG. 13 also shows a further characteristic profile 50, in which the motor is operated at an increased rotation speed in the region of its no-load rotation speed, according to the characteristic 44, which has been shifted parallel by an increased line voltage. However, if the torque exceeds a specific threshold value, then the rotation speed is, however, reduced more quickly until the characteristic profile of the normal characteristic 42 is reached again. This use of a higher rotation speed in the vicinity of the no-load rotation speed with a low torque is possible without thermal overloading, since the maximum power is in fact not achieved here in any case. In contrast, the rotation speed with a higher torque is reduced more quickly, in order to prevent a rise in the maximum power to impermissible values for continuous operation.

Figure 14:
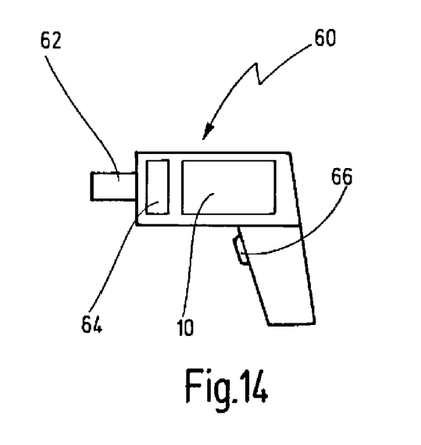
FIG. 14 shows a highly simplified illustration of an electric tool having a motor according to the invention.

By way of example, FIG. 14 shows the use of a motor 10 according to the invention for an electric tool 60 in the form of a screwdriver. The electric tool 60 has a chuck for holding a tool. The motor 10 is coupled to a single-step or multi-step mechanical gearbox 64, which may also be switchable if required. By way of example, a push button 66 can be used to allow the user to influence the control circuit.

What is claimed is:

1. An electric motor system comprising:
   a direct current motor having a rated speed/torque relationship;
   an electronically controllable switching arrangement that weakens an induced back-emf; and
   a control circuit that continuously controls said direct current motor, said control circuit permanently altering a speed/torque relationship of said direct current motor from said rated speed/torque relationship while said switching arrangement simultaneously actively controls weakening of said induced back-emf.

2. The system of claim 1, wherein said switching arrangement switches a plurality of rechargeable-battery cells for supplying voltage to said motor between series and parallel arrangement.

3. The system of claim 2, wherein said switching arrangement is configured for increasing phase voltage.

4. The system of claim 2, wherein said control circuit is configured for limiting motor power as a function of at least one operating parameter over the entire operating range during continuous operation.

5. The system according to claim 4, wherein said operating parameter is chosen from the group consisting of rotation speed, torque, current draw, temperature, and combinations thereof.

6. The system of claim 2, wherein said control circuit is configured for controlling power of said motor on the basis of comparing at least one operating parameter with permissible values of said operating parameter.

7. The system of claim 2, wherein said control circuit is configured for controlling phase voltage of said motor by measuring an actual value of at least one operating parameter, and subsequent determining and implementing of an associated value of a voltage change.

8. The system of claim 7, further comprising a memory for storing permissible values of operating parameters in a form selected from the group consisting of a matrix, a family of characteristics, and a mathematical function.

9. The system of claim 7, further comprising a memory for storing values for reducing voltage for specific operating parameters in a form selected from the group consisting of a matrix, a family of characteristics and a mathematical function.

10. The system of claim 2, wherein said control circuit is configured for influencing motor power as a function of load of said motor.

11. The system of claim 2, wherein said control circuit is configured for influencing motor power as a function of a user.

12. The system according to claim 2, wherein said control circuit is configured for influencing the switching arrangement as a function of permissible values for at least one operating parameter of said motor.

13. The system according to claim 2, wherein said control circuit is configured for continuously influencing the switching arrangement, depending on said operating parameter.

14. The system according to claim 2, wherein said control circuit is programmed for automatic switching for keeping an operating parameter constant.

15. The system of claim 1, further comprising:
   a sensor for detecting a time-dependent rise in a load on said motor, said sensor being coupled to said control circuit for initiating an increase in output power of the motor, over a limited time, if a predetermined threshold value is exceeded.

16. The system of claim 15, wherein said motor comprises a plurality of coils having a certain number of turns with a constant filling factor being designed for operating in a thermally unstable state during continuous operation without the aid of said control circuit, and wherein said control circuit is configured for operating said motor in a thermally stable state during continuous operation.

17. The system according to claim 15, wherein said control circuit is configured for reducing output power of said motor to rating or to a value below this, once a specific time interval has passed after initiation of the limited increase in motor power, or after a product of a square of current and time has reached a specific threshold value.

18. The system according to claim 1, wherein said switching arrangement is configured as a switching arrangement selected from the group consisting of a star-delta coil switching arrangement, a switching arrangement for switching coils between a series and a parallel arrangement, and a coil-group switching arrangement configured for switching coil groups between series and parallel arrangement.

19. An electric motor system, comprising:
a direct current motor having a rated speed/torque relationship;
an electronically controllable switching arrangement that weakens an induced back-emf; and
a PWM control circuit that continuously controls said direct current motor, said PWM control circuit permanently altering a speed/torque relationship of said direct current motor from said rated speed/torque relationship while said switching arrangement simultaneously actively controls weakening of said induced back-emf, for effecting a desired operating characteristic of said direct current motor that is thermally permissible during rated operation.

20. An electric motor system, comprising:
a direct current motor having a rated speed/torque relationship;
an electronically controllable switching arrangement that weakens an induced back-emf, said switching arrangement being selected from the group consisting of a star delta coil switching arrangement, a switching arrangement that switches coils between a series and a parallel arrangement, and a coil group switching arrangement configured for switching coil groups between series and parallel arrangement; and
a PWM control circuit that continuously controls said direct current motor, said PWM control circuit permanently altering a speed/torque relationship of said direct current motor from said rated speed/torque relationship while said switching arrangement simultaneously actively controls weakening of said induced back-emf, for effecting a desired operating characteristic of said motor that is thermally permissible during rated operation.

* * * * *